United States Patent
Toledo et al.

(10) Patent No.: US 10,476,356 B2
(45) Date of Patent: Nov. 12, 2019

(54) MAINTAINING DOUBLE FEED INDUCTION GENERATOR WYE RING

(71) Applicant: GE Energy Power Conversion Technology Ltd., Rugby, Warwickshire (GB)

(72) Inventors: Thiago Arouca Toledo, Campinas (BR); Robert Duarte Barbosa, Americana (BR); Waldemar Joaquim Pereira, Campinas (BR)

(73) Assignee: GE ENERGY POWER CONVERSION TECHNOLOGY LTD., Warwickshire (GB)

( * ) Notice: Subject to any disclaimer, the term of this patent is extended or adjusted under 35 U.S.C. 154(b) by 261 days.

(21) Appl. No.: 15/405,806

(22) Filed: Jan. 13, 2017

(65) Prior Publication Data

US 2018/0205297 A1 Jul. 19, 2018

(51) Int. Cl.
| | |
|---|---|
| *H02K 11/30* | (2016.01) |
| *H02K 5/22* | (2006.01) |
| *H02K 17/42* | (2006.01) |
| *H02K 7/18* | (2006.01) |
| *F03D 9/25* | (2016.01) |
| *H02K 3/51* | (2006.01) |
| *H02K 15/00* | (2006.01) |
| *H02K 17/24* | (2006.01) |

(52) U.S. Cl.
CPC .............. *H02K 11/30* (2016.01); *F03D 9/25* (2016.05); *H02K 3/51* (2013.01); *H02K 5/225* (2013.01); *H02K 7/1838* (2013.01); *H02K 15/0006* (2013.01); *H02K 17/24* (2013.01); *H02K 17/42* (2013.01); *H02K 2213/06* (2013.01); *Y02E 10/725* (2013.01)

(58) Field of Classification Search
CPC .......... F03D 9/25; H02K 11/30; H02K 17/42; H02K 5/225; H02K 7/1838; H02K 15/0006; H02K 17/24; H02K 2213/06; H02K 3/51
USPC ......................................................... 310/71
See application file for complete search history.

(56) References Cited

U.S. PATENT DOCUMENTS

| | | | | |
|---|---|---|---|---|
| 6,570,289 | B1 * | 5/2003 | Liang | H02K 3/28 310/179 |
| 6,788,031 | B2 * | 9/2004 | Pendell | H02K 17/42 322/44 |
| 7,956,563 | B2 * | 6/2011 | Perisic | B60L 11/1868 180/65.1 |
| 8,397,382 | B2 * | 3/2013 | Anasis | B23P 6/002 29/889.1 |

(Continued)

FOREIGN PATENT DOCUMENTS

| | | | |
|---|---|---|---|
| JP | 63249440 A | * | 10/1988 |
| JP | S63-249440 A | | 10/1988 |

OTHER PUBLICATIONS

Extended European Search Report and Opinion issued in connection with corresponding EP Application No. 18151262.5 dated Jun. 4, 2018.

*Primary Examiner* — Alex W Mok
(74) *Attorney, Agent, or Firm* — Wood IP LLC

(57) ABSTRACT

Provided is an auxiliary wye ring configured for supplemental attachment to a deployed generator. The generator includes a rotor and windings extending circumferentially around the rotor. The auxiliary wye ring includes connection points for coupling to an original wye ring attached to the deployed generator prior to deployment.

19 Claims, 8 Drawing Sheets

(56) References Cited

U.S. PATENT DOCUMENTS

| | | | |
|---|---|---|---|
| 9,083,220 B2* | 7/2015 | Neumann | H02K 15/0081 |
| 2009/0033274 A1* | 2/2009 | Perisic | B60L 11/1868 |
| | | | 318/771 |
| 2012/0248922 A1* | 10/2012 | Imazawa | H02K 3/28 |
| | | | 310/198 |
| 2015/0028703 A1* | 1/2015 | Neumann | H02K 15/0006 |
| | | | 310/71 |
| 2015/0101180 A1 | 4/2015 | Neumann et al. | |
| 2015/0145554 A1* | 5/2015 | Moldenhauer | G01R 31/343 |
| | | | 324/765.01 |
| 2015/0204193 A1* | 7/2015 | Anasis | F01D 5/005 |
| | | | 29/889.1 |
| 2016/0043603 A1* | 2/2016 | Hayasaka | H02K 3/51 |
| | | | 310/71 |

* cited by examiner

MAINTAINING DOUBLE FEED INDUCTION GENERATOR WYE RING

TECHNICAL FIELD

The present invention relates generally to generator maintenance. More specifically, the present invention relates to preventing wye ring failure followed by rotor insulation failure in a double feed induction generator (DFIG).

BACKGROUND

Some known wind turbines include machines for converting variable speed mechanical input, from blades of the wind turbine, into electric power that is compliant with an electrical grid. For example, the wind turbines may include a DFIG wind generator for converting the variable speed mechanical input.

Some conventional DFIG wind generator rotors have a floating neutral point. This floating neutral point is frequently provided by a device known in the art as a wye ring. The wye ring is typically made from a copper bar and is located at the non-drive end (NDE) of the generator.

A typical DFIG wind generator is constructed with coils in the rotor which are electrically connected by the wye ring creating the rotor circuit, allowing the generator to operate normally. The rotor coils and connections are a rigid piece due to the vacuum process impregnation (VPI) required to cure the coils. Wye ring is also often a source of premature failure in DFIG wind generators. The VPI process, however, makes it virtually impossible to remove existing wye ring connections for repairs.

Most wye ring premature failures are related to lack of possibility and space to accommodate thermal expansions caused by frequent speed variations of the generator since wye ring and coils connection becomes a rigid piece due to associated manufacturing processes. By way of background, DFIG wind generators are usually designed to operate at different speeds, based on existing wind conditions. The varying speeds of the turbine therefore the generator create thermal expansions producing different levels of stress specifically concentrated on the generator's rotating parts, such as the rotor.

The stresses on the rotor, along with the rotor's wye ring inability to accommodate thermal and dynamic expansions, fatigue brazed connections between the wye ring and its rotor connection points. As a result, breaks or cracks develop, creating discontinuities in the wye ring and rotor connection points.

With the occurrence of one crack, the generator can continue to function satisfactorily since current can still reach all three (i.e., associated with each phase) rotor connection points. That is, with only one crack, the existing wye ring will continue closing the rotor's electrical connections. The continued closing of the electrical connections can minimize the impact of the crack to the generator's performance.

However, if a second crack occurs in the wye ring, which could occur within hours, weeks, or years of the first crack, at least one segment (e.g., one phase) of the rotor windings will be disconnected from the floating neutral point. This disconnection will result in catastrophic failure of the generator, immediately disrupting all power generation. In most cases, the rotor coils are actually burned as a result of this second crack.

These failures can be particularly problematic and difficult to remedy. In the case of windfarms, for example, a customer may deploy thousands of DFIG wind generators. Currently, there are few practical and effective solutions to address rotor wye ring failures in the field, especially when considering the large numbers of generators deployed in wind farms.

Conventional solutions, especially with the inherent difficulties associated with the VPI process, usually involve prolonged downtime, and the risk of damaging insulation of the coils and functional connections. Certainly, there are no preventive maintenance solutions that can be applied in the field with the generator mounted in the tower.

SUMMARY

Given the aforementioned deficiencies, a need exists for a safe, simple and low cost solution that can be applied up-tower in DIFG wind generators, to avoid premature failure on rotor wye ring. More particularly, what is needed are methods and systems directed to preventative maintenance techniques that can minimize downtime associated with wye ring failure.

Under certain circumstances, embodiments of the present invention provide an auxiliary wye ring configured for supplemental attachment to a deployed generator. The generator includes a rotor and windings extending circumferentially around the rotor. The auxiliary wye ring includes connection points for coupling to an original wye ring attached to the deployed generator prior to deployment.

Embodiments of the present invention provide a unique up-tower preventive maintenance solution that entails installation of an auxiliary wye ring in the DFIG generator. This auxiliary wye ring, which can be installed in the field without removing the generator from the tower, will complement operation of the original wye ring, creating a level of redundancy. This up-tower solution is a low-cost approach that can be easily implemented with minimal downtime. This approach eliminates the risk of jeopardizing the existing insulation connections. By installing an auxiliary wye ring, especially on a deployed operational DFIG generator, before failure of the original wye ring, can extend the operational life of the generator. Using techniques described herein, the operational life, and proper function of the generator, can be extended even with two or more cracks in the original wye ring.

In accordance with the embodiments, the auxiliary wye ring will be welded to the original wye ring to create the required electrical connections. This approach provides a robust solution that accommodates thermal expansions due to its developed design solution which is made of several layers (e.g., four) of a thermally conductive metal, such as copper. This approach also provides enhanced insulation using, for example, mica and kapton, and an epoxy resin which are applied in the new wye ring to ensure adequate electrical protection for the wye ring and rotor connection coils.

That is, the embodiments provide a multilayered wye ring that accommodates the thermal, and dynamic expansion of the original wye ring (e.g., drastically minimize fatigue aspects) caused by the turbine/generator operating conditions to reduce the stresses that trigger wye ring cracks.

The rotor balance or its residual unbalance is also a very important topic to be considered to ensure no vibration issues after assemble of the new wye ring. Appropriate/adequate locations were established during design to ensure generator will operate normally, e.g., parts added and attached accordingly between two wye ring (newly and existing one)

Additional features, modes of operations, advantages, and other aspects of various embodiments are described below with reference to the accompanying drawings. It is noted that the present disclosure is not limited to the specific embodiments described herein. These embodiments are presented for illustrative purposes. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility. Circuitry, methods, and devices configured to prevent day burner failures in luminaires are described in detail below, according to several non-limiting exemplary embodiments.

Embodiments of the present invention provide a low-cost easily implemented solution to preventing wye ring failure in generators, most specifically in DFIG wind generators. In the embodiments, existing deployed DFIG wind generators, such as those used in windfarms, can be retrofitted with an auxiliary wye ring configured for supplementing operation of an original wye ring installed when the DIFG wind generator was manufactured.

The auxiliary wye ring provides redundant electrical paths enabling the generator to continue operating normally when two or more cracks occur in the original wye ring. This unique preventive maintenance technique can be executed in the field without removing the generator from the tower.

Figure 1:
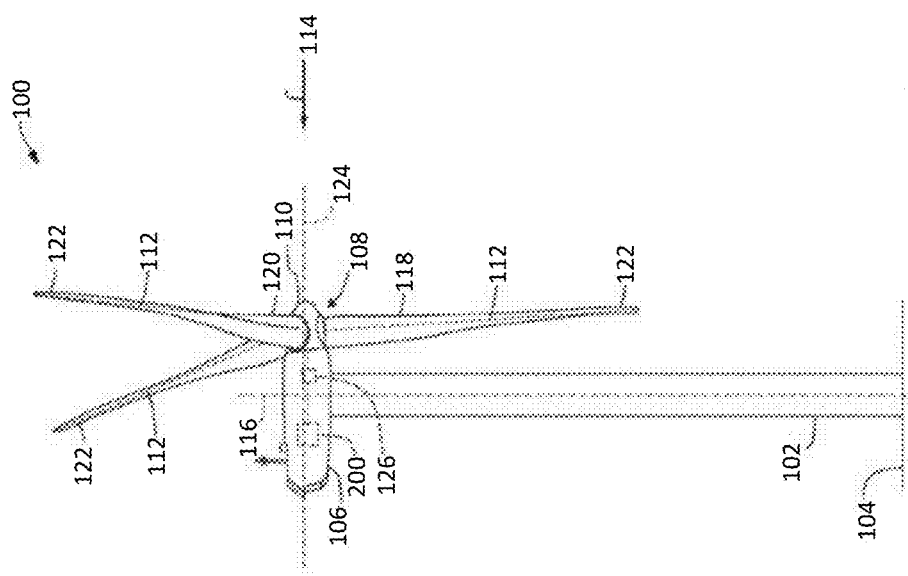
FIG. 1 is a schematic illustration of an exemplary wind turbine in which embodiments of the present invention may be implemented.

By way of background, FIG. 1 is a schematic illustration of an exemplary wind turbine 100. In the exemplary embodiment, wind turbine 100 is a horizontal-axis wind turbine. Alternatively, wind turbine 100 may be a vertical-axis wind turbine. in the exemplary embodiment, wind turbine 100 includes a tower 102 extending from and coupled to a supporting surface 104. Tower 102 may be coupled to surface 104 with anchor bolts or via a foundation mounting piece (neither shown), for example.

A nacelle 106 is coupled to the tower 102, and a main shaft assembly 108 is coupled to the nacelle 106. A main shaft assembly 108 includes a rotatable hub 110 and a plurality of rotor blades 112 coupled to the hub 110. In the exemplary embodiment, the main shaft assembly 108 includes three rotor blades 112. Alternatively, the main shaft assembly 108 may have any suitable number of rotor blades 112 that enables wind turbine 100 to function as described herein. The tower 102 may have any suitable height and/or construction that enables the wind turbine 100 to function as described herein.

Rotor blades 112 are spaced about hub 110 to facilitate rotating the main shaft assembly 108, thereby transferring kinetic energy from wind 114 into usable mechanical energy, and subsequently, electrical energy. The main shaft assembly 108 and the nacelle 106 are rotated about the tower 102 on a yaw axis 116 to control a perspective of rotor blades 112 with respect to a direction of wind 114.

The rotor blades 112 are mated to the hub 110 by coupling a rotor blade root portion 118 to hub 110 at a plurality of load transfer regions 120. Load transfer regions 120 each have a hub load transfer region and a rotor blade load transfer region (both not shown in FIG. 1). Loads induced to the rotor blades 112 are transferred to the hub 110 via load transfer regions 120. Each rotor blade 112 also includes a rotor blade tip portion 122. As the wind 114 contacts the rotor blade 112, lift forces are induced to the rotor blade 112 and rotation of main shaft assembly 108 about an axis of rotation 124.

The wind turbine 100 includes a main gearbox 126 and a generator 200 within the nacelle 106. In the exemplary embodiments, the main shaft assembly 108 includes a low-speed shaft (not shown in FIG. 1) that extends into the main gearbox 126 and a high-speed shaft (not shown in FIG. 1) extends to the generator 200.

Figure 2:
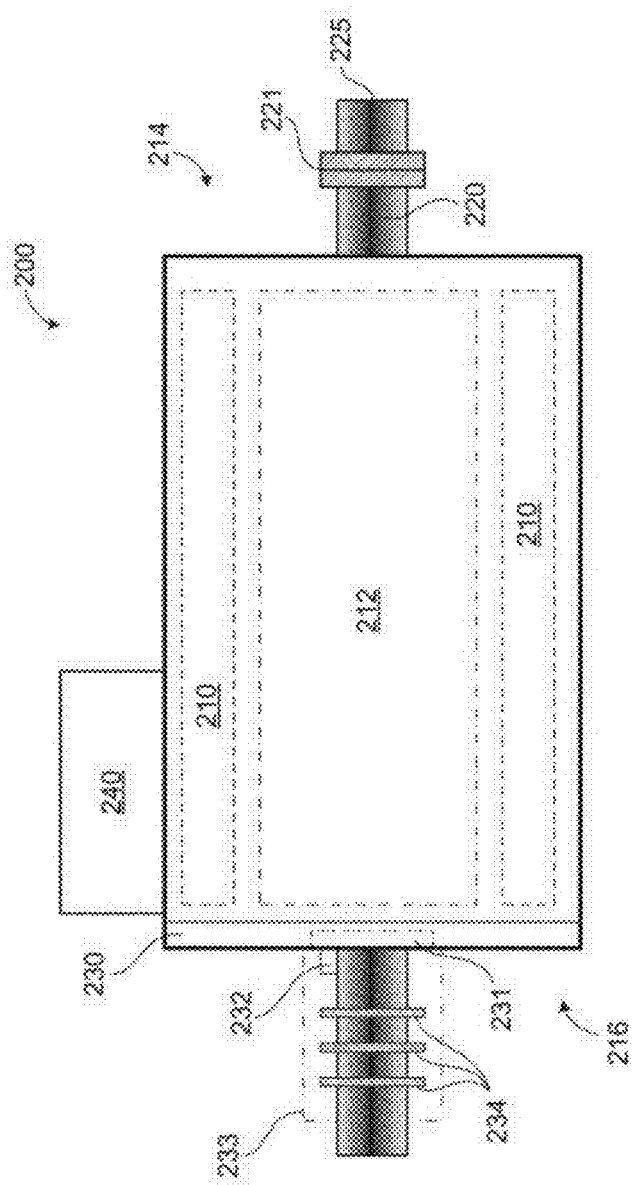
FIG. 2 is an illustration a schematic view of exemplary generator used in though when turbine of FIG. 1, constructed in accordance with the embodiments.

FIG. 2 is an illustration a schematic view of the exemplary generator 200 shown in FIG. 1. The generator 200 includes a stator (or field) 210 and a rotor (or armature) 212. A generator input shaft 220 is coupled to a gearbox output shaft 225 via a coupling 221. Typically, the coupling 221 is a bolted flange configuration. The generator input shaft 220 is located at the drive end (DE) 214 of the generator 200.

An opposing end of the generator 200 is the NDE 216. The NDE 216 includes a bearing shield 230. The bearing shield 230 may also include an inner bearing cover 231, and the outside of the bearing shield 230 may be configured for attachment of an oil slinger 232, and a slip ring housing 233 containing slip rings 234. A heat exchanger 240 is located at the top of the generator 200.

Figure 3:
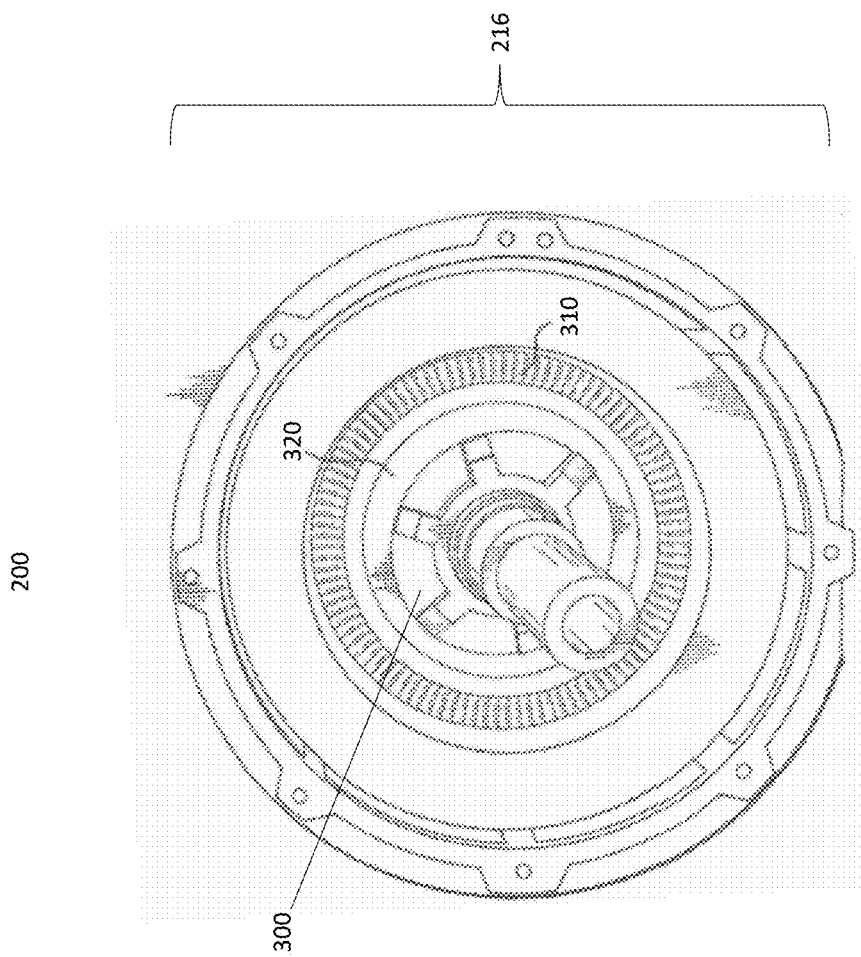
FIG. 3 is an illustration of a perspective view of a non-drive end (NDE) of the generator, depicted in FIG. 2.

FIG. 3 is an illustration of a perspective view of the NDE 216 of the generator 200 with the rotor fan removed. A rotor 300 includes end windings 310 that extend circumferentially around the rotor 300. The end-windings 310 are connected to a wye-ring 320 fitted radially inside the end windings 310. Although conventional wye ring are constructed of a single layer, the exemplary wye ring 320 is constructed of 4 layers. The wye ring 320 includes copper bars curved into a generally circular shape. Also, the wye ring 320 provides a floating neutral connection for the (typically) three phases of the rotor windings. The wye ring 320 is normally insulated by wrapping and/or encapsulating in dielectric material.

Figure 4:
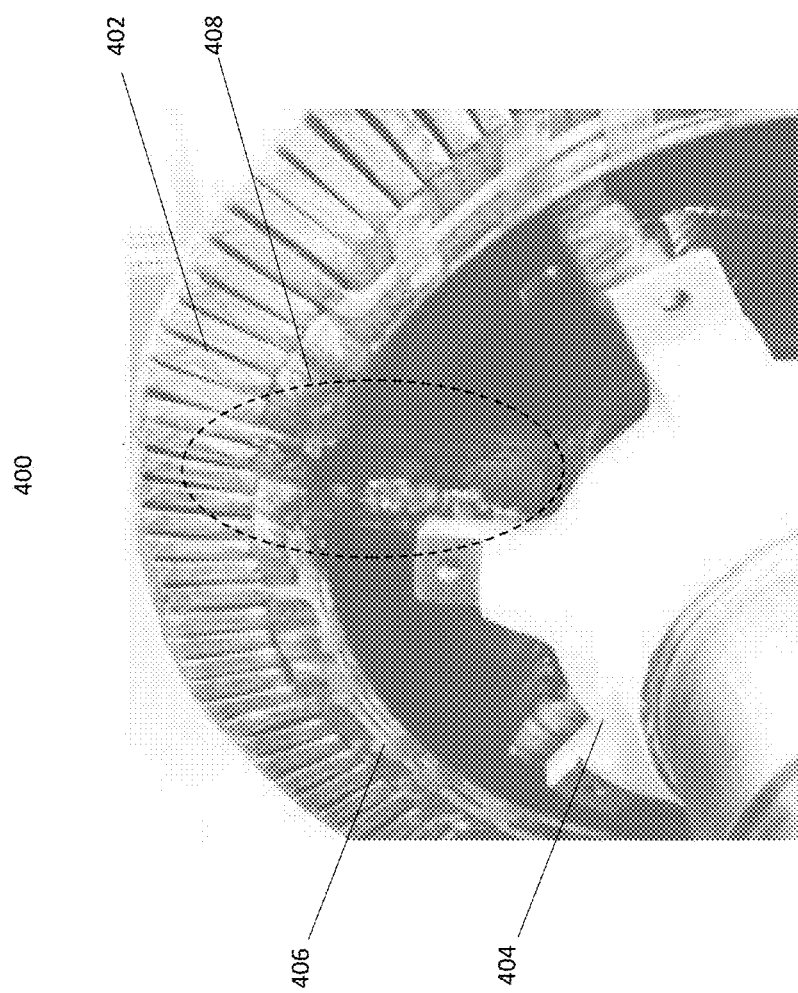
FIG. 4 is an illustration of a perspective view of a conventional generator depicting a cracked wye ring.

FIG. 4 is an illustration of a perspective view 400 of the NDE of a generator including end windings 402 extending circumferentially around a rotor 404. A factory (i.e., original) wye ring 406 is fitted inside of the end windings 402. As a result of its inability to accommodate thermal expansion, or other sources of stress discussed above, the original wye ring 406 is shown in a failed state, including a fault 408 (e.g., break or crack).

Generally, a single fault, such as the crack 408, will not cause complete failure of the generator since the wye ring 406 can continue closing the rotor's electrical connections (not shown). The continued closing of these electrical connections can minimize the impact the crack 408 to the generator's performance. As noted above, however, if a second crack occurs in the wye ring 406, which could unpredictably occur within hours, or years of the crack 408, at least one segment (e.g., one phase) of the end windings 402 will be disconnected.

Figure 5B:
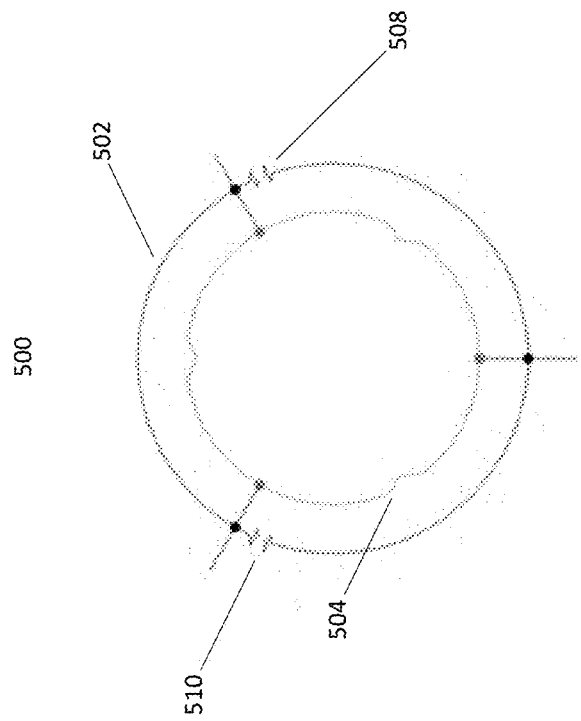
FIG. 5B is a schematic illustration of the generator assembly of FIG. 5A including an original wye ring with two cracks, and an auxiliary wye ring attached to the original wye ring, in accordance with the embodiments.
Figure 5A:
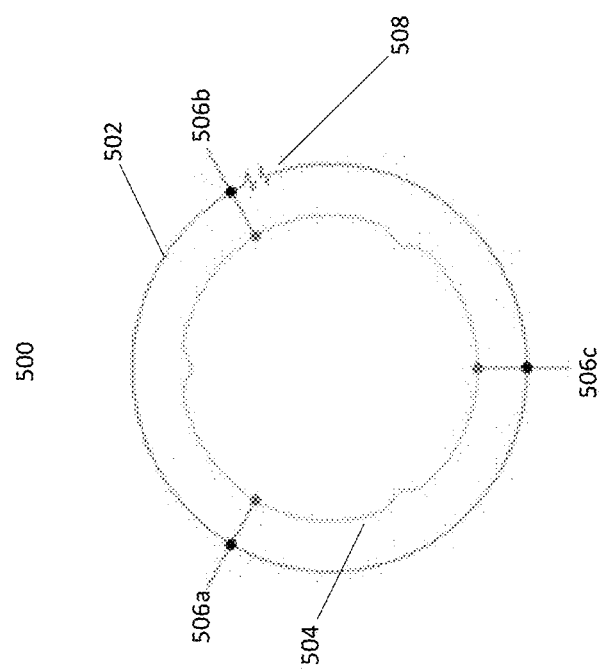
FIG. 5A is a schematic illustration of a generator assembly including an original wye ring having a single crack, and an auxiliary wye ring attached to the original wye ring, in accordance with the embodiments.

FIG. 5A is a schematic illustration of a generator assembly 500 including an original wye ring 502. In accordance with the embodiments, an auxiliary wye ring 504 is electrically coupled, or attached, to the original wye ring 502 at three (03) connection points, therefore properly attached (lashing) to ensure required stability. The auxiliary wye ring 504 is configured to supplement operation of the original wye ring 502. More specifically, the auxiliary wye ring 504 serves as a backup, providing redundant operation of the original wye ring 502.

A connection point 506a forms a first electrical connection between the original wye ring 502 and the auxiliary wye ring 504. By way of example, the connection point 506a may correspond with a first phase of electrical power generation. Similarly, additional electrical connection points 506b and 506c, potentially corresponding to second and third phases of electrical power, connect the original wye ring 502 with the auxiliary wye ring 504.

In the exemplary embodiments, the actual connections 506a-506c can be formed by welding, or any other suitable technique for forming a robust electrical connection between metallic surfaces. As shown in FIG. 5A, a single crack 508 has occurred in the original wye ring 502. In FIG. 5A, the single crack 508 will not impact operation of the original wye ring 502. Thus, the original wye ring 502 will continue performing its function of closing the rotor electrical connections. As a result, the corresponding rotor electrical circuit will remain closed and performance of the rotor will not be impacted.

FIG. 5B is a schematic illustration of the generator assembly 500 of FIG. 5A including a second crack 510 in the original wye ring 502. As noted above, occurrence of a second crack, such as the crack 510, would be catastrophic to the performance of a conventional generator. In the conventional generator, the second crack 510 would disconnect the rotor windings (e.g., windings 402 of FIG. 4) from the floating neutral point (not shown). This disconnection would result in immediate disruption of all power generation. In the arrangement 500, constructed in accordance with the embodiments, connectivity of the auxiliary wye ring 504 facilitates the continued optimal performance of the generator assembly 500, even with two or more cracks in the original wye ring 502.

Figure 6:
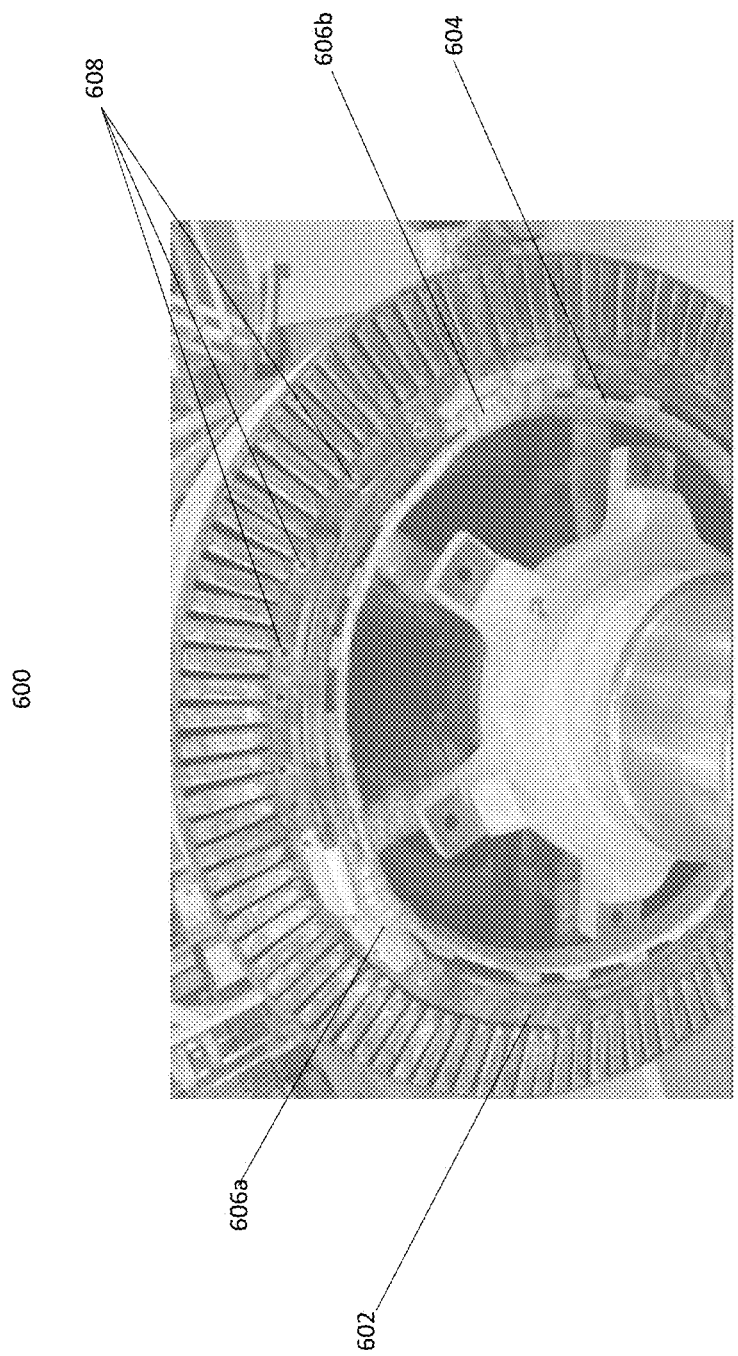
FIG. 6 is an illustration of an exemplary generator assembly including an auxiliary wye ring, in accordance with the embodiments.

FIG. 6 is an illustration of an exemplary generator assembly 600, constructed in accordance with the embodiments. The generator assembly 600 includes an original wye ring 602 and an auxiliary wye ring 604. In the generator assembly 600, the auxiliary wye ring 604 is connected to the original wye ring 602 via welding at welding joints 606a and 606b.

By way of example, holes 608 are desirably drilled into the original wye ring 602 to permit mechanical attachment (e.g., lashing) of the auxiliary wye ring 604 to the original wye ring 602, in support of the electrical connections created by the welding connection points 602a and 602b.

Figure 7:
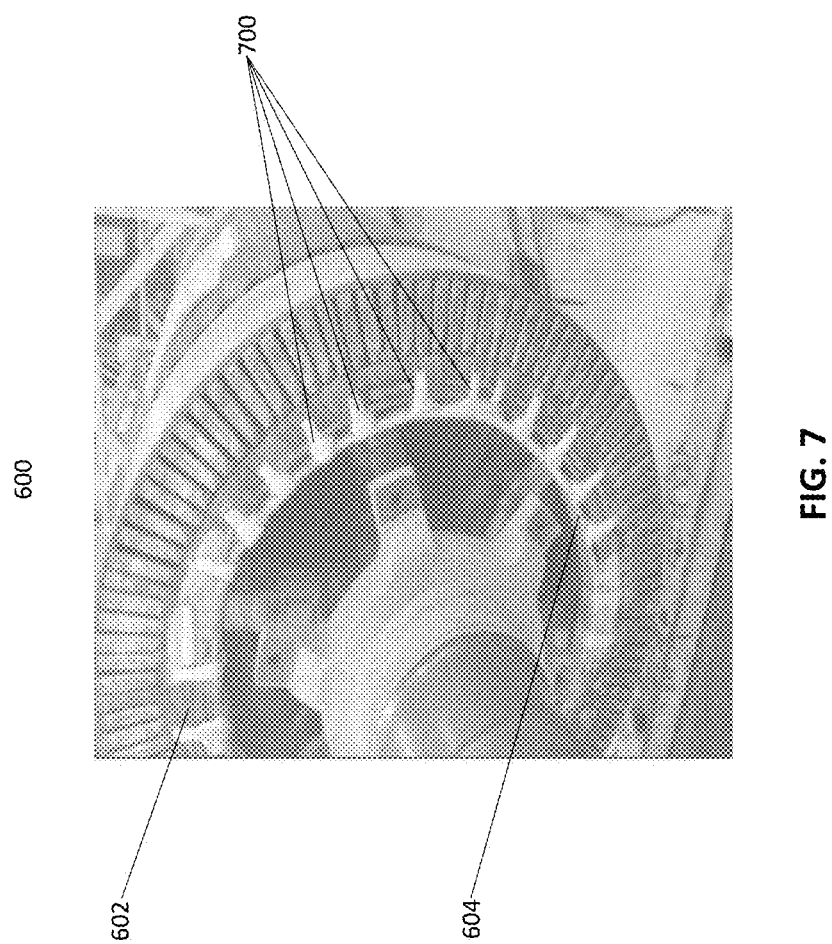
FIG. 7 is an illustration of the exemplary generator assembly of FIG. 6, depicting mechanically attaching the auxiliary wye ring to the original wye ring.

FIG. 7 is an illustration of the exemplary generator assembly 600 depicting lashing 700 for facilitating mechanical attachment of the auxiliary wye ring 604 to the original wye ring 602. This is required to guarantee mechanical stability of the wye ring and rotor balancing. The lashing 700, is cured with an epoxy resin (air cured) is provided to complete the attachment, providing mechanical stability of the original wye ring 602 with respect to the auxiliary wye ring 604. After lashing, properly sized pieces, for example, made of glass cloth base laminated epoxy sheet are assembled in the small gap between two wye rings to ensure rotor balance is not affected. Appropriate lashing using correct number holes drilled in the insulation area of the existing wye ring as well as the number of turns are critical to ensure stability of new wye ring as well as to ensure rotor remains balanced.

Figure 8:
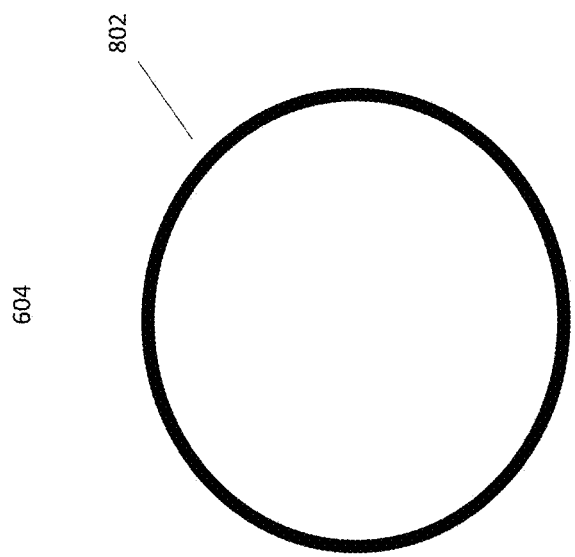
FIG. 8 is a detailed illustration of the exemplary auxiliary wye ring shown in FIG. 7.
Figure 8:
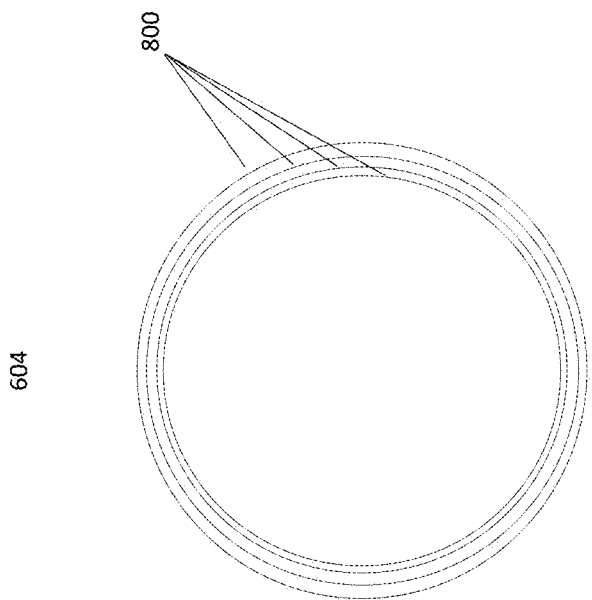

FIG. 8 is a detailed illustration of the exemplary auxiliary wye ring 604 shown in FIG. 7. In the embodiments, and by way of example only and not limitation, the auxiliary wye ring 604 can be formed of a soft malleable ductile metal with very high thermal and electrical connectivity. One such suitable metal is copper. Although the auxiliary wye ring 604 is a single piece, it is formed of multiple layers 800.

These multiple layers (e.g., copper) 800 can be welded together to form a single layer 802. This multi-layered construction can be important to accommodating thermal expansion, created by the different operational speeds of the generator. Prior to installation, the auxiliary wye ring 604 will normally be insulated by mica and kapton wrapped and/or encapsulating within a dielectric material.

Embodiments of the present invention provide a low-cost, easily implemented solution for preventing wye ring failure in generators, such as DFIG wind generators. The solution described herein, which entails retrofitting existing DFIG wind generators, provides several benefits over conventional approaches for preventing wye ring failures.

These benefits include, but are not limited to, eliminating the need to weld electrical coil connections with existing wye ring to replace the existing wye ring. In a worst case scenario, the rotor can be completely rewound and auxiliary wye rings be easily assembled in the same position of original wye rings. This approach only requires welding for electrical connections. Lashing and use of an air curable epoxy resin can mechanically attach the original wye ring to the auxiliary wye ring.

Additional benefits include substantially similar cross-sectional areas of the original wye ring and the auxiliary wye ring to ensure electrical functionality. In the embodiments, the auxiliary wye ring is constructed, by way of example, of four layers of copper which are welded to form one single piece. As noted above, such a construction can be more accommodating to thermal expansion of the material, created by the different working speeds of the generator.

Yet additional benefits and advantages include the provision of a specific area for the auxiliary wye rating to receive balance weights to ensure rotor balancing characteristics are not affected. The auxiliary wye ring is well insulated after its installation through several layers (e.g., five) of materials such as mica, kapton, and finally cured with epoxy resin (air cure). Since the technique of the embodiments was designed to be executed in the field, with the generator assembled in the tower, it provides a more convenient and economic solution to the customer. In one embodiment, the design solution includes the wye ring made of four (04) layers along with its special lashing and attachments. Other embodiments, considering the number, location and weight of the layers to ensure rotor balancing, are vital to avoid the need to remove the generator from the tower to complete disassembly and rewind the rotor.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A generator including a rotor and windings extending circumferentially around the rotor, the generator comprising:
   a first wye ring positioned within the windings, and
   a second wye ring electrically coupled to the first wye ring, the second wye ring being formed of a plurality of metallic layers.

2. The generator of claim 1, wherein the second wye ring is configured to supplement operation of the first wye ring.

3. The generator of claim 1, wherein the second wye ring is physically attached to the first wye ring.

4. The generator of claim 3, wherein the second wye ring is physically attached to the first wye ring via welding.

5. The generator of claim 1, wherein the metal is copper.

6. The generator of claim 5, wherein the plurality of copper layers are welded together to form a single layer.

7. The generator of claim 1, wherein the generator is a double feed induction generator.

8. The generator of claim 1, wherein the second wye ring configured for attachment within the first wye ring.

9. An auxiliary wye ring configured for supplemental attachment to a deployed generator, the generator including a rotor and windings extending circumferentially around the rotor, the auxiliary wye ring comprising connection points for coupling to an original wye ring attached to the deployed generator prior to deployment, the connection points forming electrical connections between the original wye ring and the auxiliary wye ring at points corresponding to each electric phase of power, wherein the auxiliary wye ring is formed of a plurality of metallic layers.

10. The auxiliary wye ring of claim 9, wherein the auxiliary wye ring is secondary to the original wye ring.

11. The auxiliary wye ring of claim 9, wherein the auxiliary wye ring is configured for being retrofitted onto the generator.

12. The auxiliary wye ring of claim 9, wherein each metallic layer of the plurality of metallic layers of the auxiliary ring is formed of an electrically conductive metal.

13. The auxiliary wye ring of claim 12, wherein the electrically conductive metal is copper.

14. The auxiliary wye ring of claim 12, wherein the the plurality of metallic layers is formed of multiple layers of copper.

15. The auxiliary wye ring of claim 9, wherein the auxiliary wye ring supplements operation of the original wye ring.

16. The auxiliary wye ring of claim 9, wherein the auxiliary wye ring is constructed of material assembled in a plurality of angular positions to ensure the rotor remains balanced after assembly.

17. The auxiliary wye ring of claim 9, wherein the auxiliary wye ring (i) includes an insulation material and (ii) is constructed of a specified number and position of holes drilled in the insulation material of the original existing wye ring to ensure auxiliary wye ring is properly attached and assembled.

18. The auxiliary wye ring of claim 9, wherein the auxiliary wye ring reduces a probability of damage to the rotor and to coil connections.

19. The auxiliary wye ring of claim 9, wherein the auxiliary wye ring is constructed of at least four layers.

* * * * *